United States Patent
Takeda et al.

(10) Patent No.: US 10,113,526 B2
(45) Date of Patent: Oct. 30, 2018

(54) IGNITION APPARATUS FOR INTERNAL COMBUSTION ENGINE

(71) Applicant: DENSO CORPORATION, Kariya, Aichi-pref. (JP)

(72) Inventors: Shunichi Takeda, Kariya (JP); Satoru Nakayama, Kariya (JP); Kanechiyo Terada, Kariya (JP)

(73) Assignee: DENSO CORPORATION, Kariya (JP)

( * ) Notice: Subject to any disclaimer, the term of this patent is extended or adjusted under 35 U.S.C. 154(b) by 79 days.

(21) Appl. No.: 15/508,222

(22) PCT Filed: Aug. 26, 2015

(86) PCT No.: PCT/JP2015/074016
§ 371 (c)(1),
(2) Date: Mar. 2, 2017

(87) PCT Pub. No.: WO2016/035639
PCT Pub. Date: Mar. 10, 2016

(65) Prior Publication Data
US 2017/0284356 A1   Oct. 5, 2017

(30) Foreign Application Priority Data

Sep. 2, 2014 (JP) ................. 2014-177643
May 11, 2015 (JP) ................. 2015-096216

(51) Int. Cl.
*F02P 9/00* (2006.01)
*F02P 15/10* (2006.01)
(Continued)

(52) U.S. Cl.
CPC ............ *F02P 3/05* (2013.01); *F02P 5/1502* (2013.01); *F02P 9/002* (2013.01); *F02P 15/00* (2013.01);
(Continued)

(58) Field of Classification Search
CPC ........ F02P 9/002; F02P 15/10; H01F 2038/122
(Continued)

(56) References Cited

U.S. PATENT DOCUMENTS 3,620,200 A * 11/1971 Stephens ............... F02P 7/03
                                                    123/149 A
5,220,901 A *  6/1993 Morita ................. F02P 3/0892
                                                    123/604
(Continued)

FOREIGN PATENT DOCUMENTS

JP      60-85250       5/1985
JP    2000-199470      7/2000
(Continued)

OTHER PUBLICATIONS

English translation of International Search Report issued in PCT/JP2015/074016, dated Nov. 10, 2015 (1 page).

*Primary Examiner* — Erick Solis
(74) *Attorney, Agent, or Firm* — Nixon & Vanderhye PC (57) ABSTRACT

An ignition apparatus for an internal combustion engine includes: a spark plug; a first ignition coil and a second ignition coil; a battery; a booster circuit that boosts a voltage supplied from the battery; a power transistor that conducts and interrupts a primary current flowing to a primary coil included in the first ignition coil; a MOSFET that applies and interrupts the voltage boosted by the booster circuit to a primary coil included in the second ignition coil; and an ECU that starts electric discharge by the spark plug by controlling the power transistor, and repeatedly applies and interrupts the voltage boosted by the booster circuit by the MOSFET so that the electric discharge that is started is maintained.

8 Claims, 6 Drawing Sheets

(51) Int. Cl.
  *F02P 3/05* (2006.01)
  *F02P 15/00* (2006.01)
  *F02P 5/15* (2006.01)
  *H01F 38/12* (2006.01)
  *F02P 3/04* (2006.01)
  *F02P 3/08* (2006.01)
  *F02P 3/09* (2006.01)
  *F02P 17/00* (2006.01)

(52) U.S. Cl.
  CPC .............. *F02P 15/10* (2013.01); *H01F 38/12* (2013.01); *F02P 3/0442* (2013.01); *F02P 3/0838* (2013.01); *F02P 3/096* (2013.01); *F02P 17/00* (2013.01); *H01F 2038/122* (2013.01)

(58) Field of Classification Search
  USPC ................................. 123/620, 621, 634, 644
  See application file for complete search history.

(56) References Cited

U.S. PATENT DOCUMENTS

| | | | |
|---|---|---|---|
| 9,903,333 B2* | 2/2018 | Terada | F02P 3/08 |
| 2007/0209645 A1* | 9/2007 | Skinner | F02P 3/02 |
| | | | 123/620 |
| 2012/0017881 A1 | 1/2012 | Kataoka et al. | |
| 2015/0219063 A1* | 8/2015 | Pawlak | F02P 3/01 |
| | | | 123/620 |
| 2017/0022961 A1 | 1/2017 | Toriyama et al. | |

FOREIGN PATENT DOCUMENTS

| | | |
|---|---|---|
| JP | 2002-039042 | 2/2002 |
| JP | 2012-004238 | 1/2012 |

* cited by examiner

IGNITION APPARATUS FOR INTERNAL COMBUSTION ENGINE

This application is the U.S. national phase of International Application No. PCT/JP2015/074016 filed on Aug. 26, 2015 which designated the U.S. and priority to JP Patent Application No. 2014-177643 filed on Sep. 2, 2014 and JP Patent Application No. 2015-096216 filed on May 11, 2015 the entire contents of each of which are hereby incorporated by reference.

TECHNICAL FIELD

The present disclosure relates to an ignition apparatus that is used in an internal combustion engine.

BACKGROUND ART

As an ignition apparatus of an internal combustion engine, a characteristic in that a secondary voltage rapidly rises is required to obtain favorable ignition performance against smoldering of a spark plug. Meanwhile, a characteristic in that discharge time is long is required to favorably maintain lean burn and normal combustion. However, to rapidly raise the secondary voltage, energy is discharged over a short amount of time by the number of secondary windings of an ignition coil being reduced or the like. Therefore, the discharge time is shortened. In this way, the requirement for these two characteristics causes a contradiction. Here, the two requirements can be simultaneously met by multiple discharge being performed through use of a plurality of ignition coils and the characteristics of individual ignition coils being combined.

As a configuration that meets the two requirements, there is a configuration in which a cylindrical ignition coil (stick coil) is set between a spark plug and a rocker cover, and a rectangular ignition coil is connected to an upper end portion of the stick coil and placed on the rocker cover (refer to PTL 1). In the configuration described in PTL 1, the two ignition coils can be compactly arranged, and an ignition apparatus having a multiple discharge characteristic can be reduced in size.

CITATION LIST

Patent Literature

[PTL 1] JP-A-2000-199470

SUMMARY OF INVENTION

Technical Problem

In the configuration described in PTL 1, a voltage that is high enough to start electric discharge by the spark plug is applied to both ignition coils. Therefore, withstand voltages of both ignition coils are required to be high. To increase the withstand voltage of the ignition coil, insulation distance between a primary coil and an grounding body, and a secondary coil, which are included in the ignition coil, is required to be increased, thereby leading to an increase in the size of the ignition coil.

An object of the present disclosure is to enable continuous discharge by a spark plug to be performed in an ignition apparatus that includes two ignition coils, even when a withstand voltage of at least one ignition coil is configured to be low.

Solution to Problem

A first aspect of the present disclosure and effects thereof will be described below.

The present disclosure is an ignition apparatus for an internal combustion engine according to a first aspect including: a spark plug that performs electric discharge for igniting a combustible air-fuel mixture inside a combustion chamber of an internal combustion engine; a first ignition coil and a second ignition coil that include a primary coil and a secondary coil and apply a voltage to the spark plug by the secondary coil; a voltage applying unit that applies a predetermined voltage to the primary coil included in the first ignition coil; a voltage boosting unit that boosts the voltage supplied by the voltage applying unit; a first switching element that conducts and interrupts a primary current flowing to the primary coil included in the first ignition coil; a second switching element that applies and interrupts the voltage boosted by the voltage boosting unit to the primary coil included in the second ignition coil; a discharge starting unit that starts the electric discharge by the spark plug by controlling the first switching element; and a discharge maintaining unit that repeatedly applies and interrupts the voltage boosted by the voltage boosting unit by the second switching element so that electric discharge is maintained after the discharge starting unit starts the electric discharge by the spark plug.

As a result of the above-described configuration, in the ignition apparatus for an internal combustion engine of the present disclosure, the first ignition coil and the second ignition coil both include the primary coil and the secondary coil. A predetermined voltage is applied by the voltage applying unit to the primary coil included in the first ignition coil, among the foregoing. In addition, as a result of the discharge starting unit controlling the first switching element, a primary current that flows to the primary coil is applied and interrupted, and electric discharge by the spark plug is started.

In addition, in the ignition apparatus for an internal combustion engine of the present disclosure, the second switching element is further provided. After the discharge starting unit starts the electric discharge by the spark plug, the discharge maintaining unit controls the second switching element and applies the voltage that is boosted by the voltage boosting unit. As a result, the electric discharge by the spark plug is maintained. Furthermore, application and interruption of the boosted voltage is controlled. As a result, control to an optimal discharge current, such as by the discharge current being increased, decreased, or held constant, can be performed. As a result of this configuration, after the spark plug starts electric discharge, the voltage for maintaining the electric discharge can be set low, that is, 10 kV or lower. Therefore, a design withstand voltage of the second ignition coil can be reduced.

DESCRIPTION OF EMBODIMENTS

First Embodiment

Figure 1:
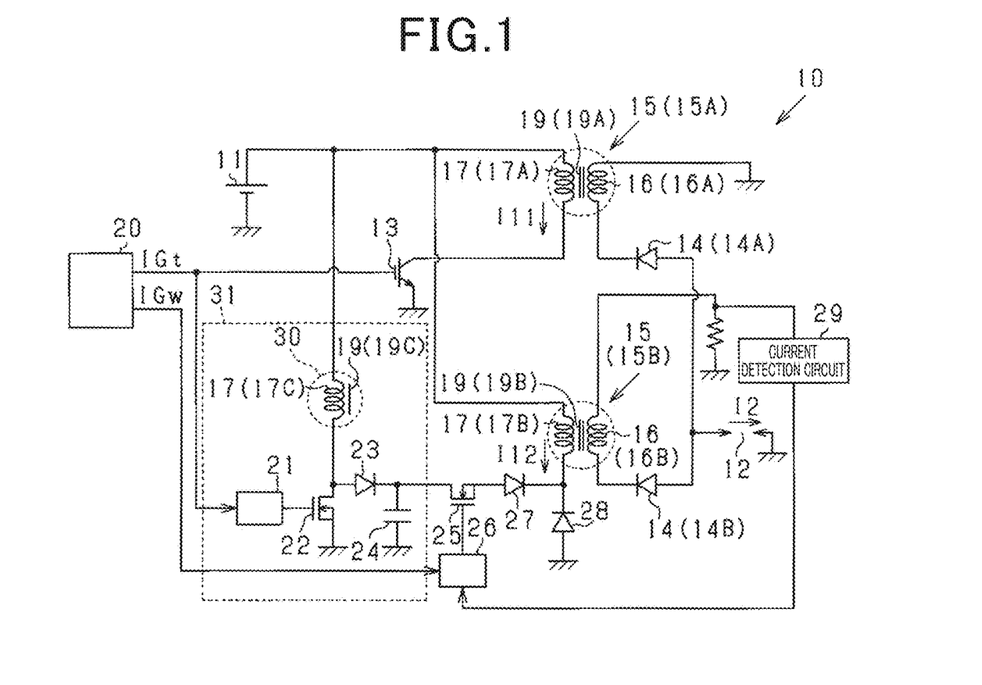
FIG. 1 is a circuit diagram of an electrical configuration of an ignition apparatus for an internal combustion engine (first embodiment)

The present disclosure will be described in detail with reference to the drawings that show embodiments. FIG. 1 shows an embodiment of an ignition apparatus for an internal combustion engine. In the figure, a configuration of an electrical circuit according to the present embodiment is shown. The electrical circuit includes a spark plug 12, a power transistor 13 (corresponding to a first switching element), a first ignition coil 15A, a second ignition coil 15B, a booster circuit 31 (corresponding to a voltage boosting means), a MOSFET 25 (corresponding to a second switching element), diodes 14, 23, 27, and 28, an ECU 20 (corresponding to a discharge starting means and a discharge maintaining means), and the like.

Here, in the ECU 20, signals are inputted from various sensors that detect parameters (such as a warmup state, engine rotation speed, engine load, presence of a lean-burn state, and degree of rotational flow) indicating an operating state and a control state of an engine. In addition, the ECU 20 includes an input circuit that processes the inputted signals, a CPU that performs control processes and calculation processes related to engine control based on the inputted signals, and the like, and stores data, programs, and the like required for engine control. Furthermore, the ECU 20 includes various memories that hold the stored data, programs, and the like, an output circuit that outputs signals required for engine control based on the processing results from the CPU, and the like. Moreover, the ECU 20 acquires engine parameters from the various sensors, and generates and outputs a discharge start signal IGt and a continued discharge signal IGw based on the acquired engine parameters.

The first ignition coil 15A and the second ignition coil 15B respectively include primary coils 17A and 17B. The first ignition coil 15A and the second ignition coil 15B are known structures that generate a secondary current I2 in secondary coils 16A and 16B by electromagnetic induction, based on increase and decrease in primary currents I11 and I12 flowing through the primary coils 17A and 17B, and perform electric discharge by the spark plug 12. In both primary coils 17A and 17B, a first end is connected to an output electrode of a battery (corresponding to a voltage applying means) 11, and a second end is connected to earth via various electronic elements and the like. As a result of this configuration, in the ignition apparatus 10 for an internal combustion engine according to the present embodiment, voltage supplied from the battery 11 can be applied to the primary coil 17A. In addition, in both secondary coils 16A and 16B, a first end is connected to a center electrode of the spark plug 12 via the diode 14, and a second end is connected to the earth.

An emitter terminal of the power transistor 13 is connected to the earth, and a collector terminal is connected to the second end of the primary coil 17A. The power transistor 13 conducts and interrupts the primary current I11 flowing from the battery 11 to the primary coil 17A. The conduction and interruption are controlled by the discharge start signal IGt that is transmitted from the ECU 20 connected to a base terminal of the power transistor 13. That is, the discharge start signal IGt controls an ON/OFF operation of the power transistor 13. More specifically, the discharge start signal IGt is a signal commanding a period over which magnetic energy is accumulated in the primary coil 17A. The power transistor 13 can also be substituted by an IGBT, a MOS transistor, a thyristor, or the like.

In the ignition apparatus 10 for an internal combustion engine according to the present embodiment, the ECU 20 provides the discharge start signal IGt and the power transistor 13 performs the ON operation. As a result, the voltage of the battery 11 is applied to the primary coil 17A, the primary current I11 is conducted, and magnetic energy is accumulated in the primary coil 17A. Subsequently, as a result of interruption by the power transistor 13, the magnetic energy accumulated in the primary coil 17A is converted to electric energy by electromagnetic induction. As a result, a high voltage is generated in the secondary coil 16A. In addition, a high voltage is applied across the electrodes of the spark plug 12 to generate an electric discharge.

The booster circuit 31 boosts the voltage of the battery 11 and accumulates the voltage as electric energy in a capacitor 24. The booster circuit 31 boosts and accumulates the voltage of the battery 11 during the period over which the ECU 20 provides the discharge start signal IGt. In addition, the booster circuit 31 includes a choke coil 30, a MOSFET 22, a first control circuit 21, and the diode 23, in addition to the capacitor 24.

Here, in the choke coil 30, a first end is connected to a positive electrode of the battery 11, and an energization state of the choke coil 30 is continued and discontinued by the MOSFET 22. In addition, the first control circuit 21 provides the MOSFET 22 with a control signal, and turns ON and OFF the MOSFET 22. As a result of the ON/OFF operation of the MOSFET 22, the magnetic energy accumulated in the choke coil 30 charges the capacitor 24 as electric energy.

The first control circuit 21 is provided so as to repeatedly turn ON and OFF the MOSFET 22 during the period over which the ECU 20 provides the discharge start signal IGt.

In addition, the diode 23 prevents backflow of the electric energy accumulated in the capacitor 24 towards the choke coil 30 side.

As a result of the ON/OFF operation, the MOSFET 25 applies and interrupts the voltage accumulated in the capacitor 24 to the primary coil 17B. At this time, as a result of the MOSFET 25 performing the ON operation, the electric energy accumulated in the capacitor 24 is inputted to the primary coil 17B. As a result, in the ignition apparatus 10 for an internal combustion engine according to the present embodiment, a current in the same direction as a discharge current generated by the power transistor 13 being turned ON and OFF is added in a superimposing manner between the electrodes of the spark plug 12. Electric discharge thereby is continued following the start of electric discharge. The MOSFET 25 is turned ON and OFF by the control signal provided by a second control circuit 26.

The second control circuit 26 repeatedly switches the control signal between high and low, and outputs the control signal during a period over which the ECU 20 provides the continued discharge signal IGw. Here, the continued discharge signal IGw is a signal commanding a period over which electric discharge is continued. More specifically, the continued discharge signal IGw is a signal commanding a continuing period of the voltage applied to the primary coil 17B from the booster circuit 31 as a result of the second control circuit 26 repeatedly turning ON and OFF the MOSFET 25.

The MOSFET 25 successively inputs electric energy from the booster circuit 31 to the primary coil 17B by being repeatedly turned ON and OFF while the ECU 20 is providing the continued discharge signal IGw. As a result, in the ignition apparatus 10 for an internal combustion engine according to the present embodiment, electric discharge is continued. The MOSFET 25 can be substituted by a power transistor, a thyristor, or the like.

Diodes 14A and 14B are respectively provided between the center electrode of the spark plug 12 and the secondary coil 16A and between the center electrode of the spark plug 12 and the secondary coil 16B. The diodes 14A and 14B set the directions of the secondary current at the start of electric discharge and during the subsequent continued discharge to be the same direction. More specifically, the diodes 14A and 14B are provided so that the secondary current flowing to the secondary coil 16A as a result of the power transistor 13 being turned ON and OFF and the secondary current flowing to the secondary coil 16B as a result of the MOSFET 25 being turned ON and OFF are in the same direction.

In addition, the diode 27 is provided on a source side of the MOSFET 25 and prevents backflow of current from the primary coil 17B to the booster circuit 31.

Furthermore, a current path that branches out to be connected to the earth is provided between the diode 27 and the second ignition coil 15B. The diode 28 is provided on this path. A cathode side of the diode 28 is connected to the second end side of the secondary coil 16B, and an anode side of the diode 28 is connected to the earth. Therefore, the diode 28 serves as a free-wheeling diode when the MOSFET 25 is switched from ON to OFF. That is, the diode 28 returns the current resulting from electromotive force generated in the primary coil 17B while the MOSFET 25 is OFF through a path from the primary coil 17B to the battery 11 to the earth to the diode 28 and to the primary coil 17B.

Also, in the ignition apparatus 10 for an internal combustion engine according to the present embodiment, a resistor is provided between the first end of the secondary coil 16B and the earth, and is connected to a current detection circuit 29 (corresponding to a secondary current detecting means).

Figure 2:
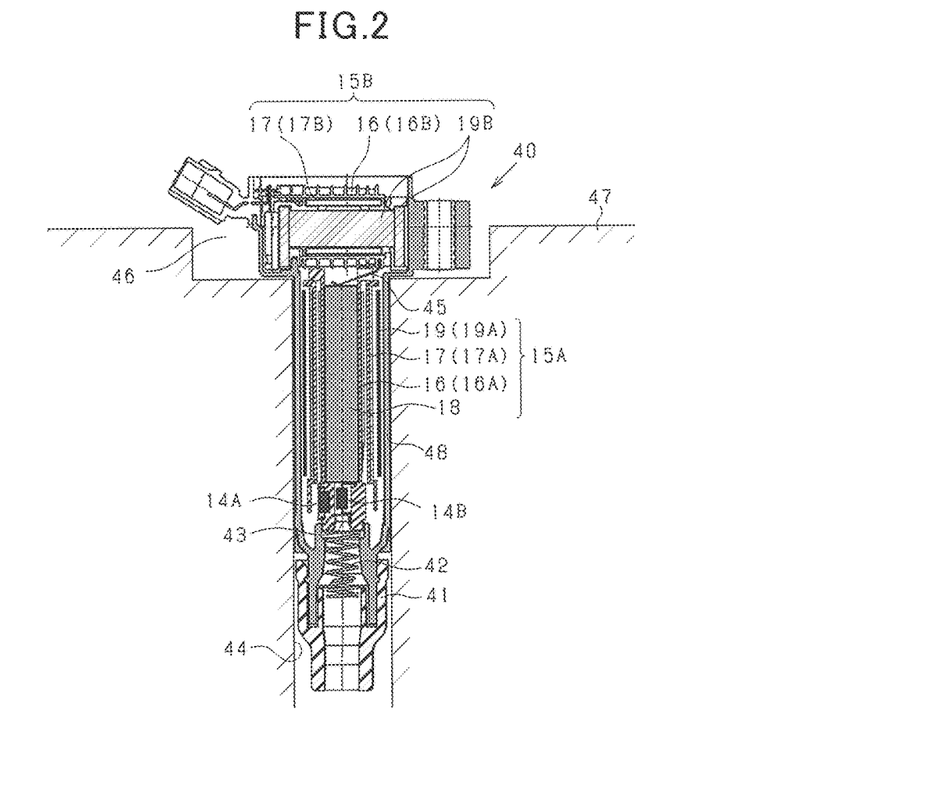
FIG. 2 is a cross-sectional view of the ignition apparatus for an internal combustion engine.

FIG. 2 illustrates an ignition apparatus 40 for an internal combustion engine that is applied to an internal combustion engine 47 in which the spark plug 12 is mounted inside a plug hole 44, and a configuration of the ignition apparatus 40 will be described below. In this configuration, the first ignition coil 15A is formed as a cylindrical ignition coil (stick coil). In addition, the second ignition coil 15B is formed as a rectangular ignition coil (rectangular coil).

The plug hole 44 is a deep hole-shaped portion that extends from a bottom surface of a housing recess portion 46 towards a combustion chamber. The housing recess portion 46 is provided on an outer surface of the internal combustion engine 47 (more accurately, a cylinder head or a head cover). In the ignition apparatus 40 for an internal combustion engine according to the present embodiment, the first ignition coil 15A is inserted into the plug hole 44 and the second ignition coil 15B is set in the upper portion of the first ignition coil 15A. Here, the withstand voltage of the second ignition coil 15B is set to be ⅓ of the withstand voltage of the first ignition coil 15A.

The first ignition coil 15A includes a center core 18, the secondary coil 16A, the primary coil 17A, and an outer core 19A, from the center side towards the outer side.

The second ignition coil 15B includes the primary coil 17B, the secondary coil 16B, and a core 19B that is laminated in an up/down direction, which are mounted from the inner side towards the outer side.

Here, in the first ignition coil 15A and the second ignition coil 15B, a wire 45 that extends from the secondary side of the second ignition coil 15B is in contact with the center core 18 of the first ignition coil 15A. A lower end portion of the center core 18 is connected to an electrode of the spark plug 12 via the diode 14B for pre-ignition prevention. Meanwhile, the secondary coil 16A of the first ignition coil 15A is connected to an electrode of the spark plug 12 via the diode 14A.

The anode sides of both diodes 14 are each connected to a cap-like high voltage terminal 43. An upper end portion of a spring terminal 42 is fitted into a lower end portion of the high voltage terminal 43 and fixed. In addition, both diodes 14 are connected to the lower end portion of the first ignition coil 15A. Furthermore, the upper end portion of the spring terminal 42 that is connected to a positive electrode of the spark plug 12 is pressed into a cylindrical cushioning member 41 that is arranged on the outer sides of the high voltage terminal 43 and the spring terminal 42. At this time, the upper end portion of the spring terminal 42 is electrically connected to the respective secondary coils 16A and 16B of the first ignition coil 15A and the second ignition coil 15B, via the high voltage terminal 43 and the diode 14, by the spring terminal 42 being compressed. The cylindrical cushioning member 41 is composed of a rubber material or the like.

Next, an operation of the ignition apparatus 10 for an internal combustion engine according to the present embodiment will be described with reference to FIG. 3.

Figure 3:
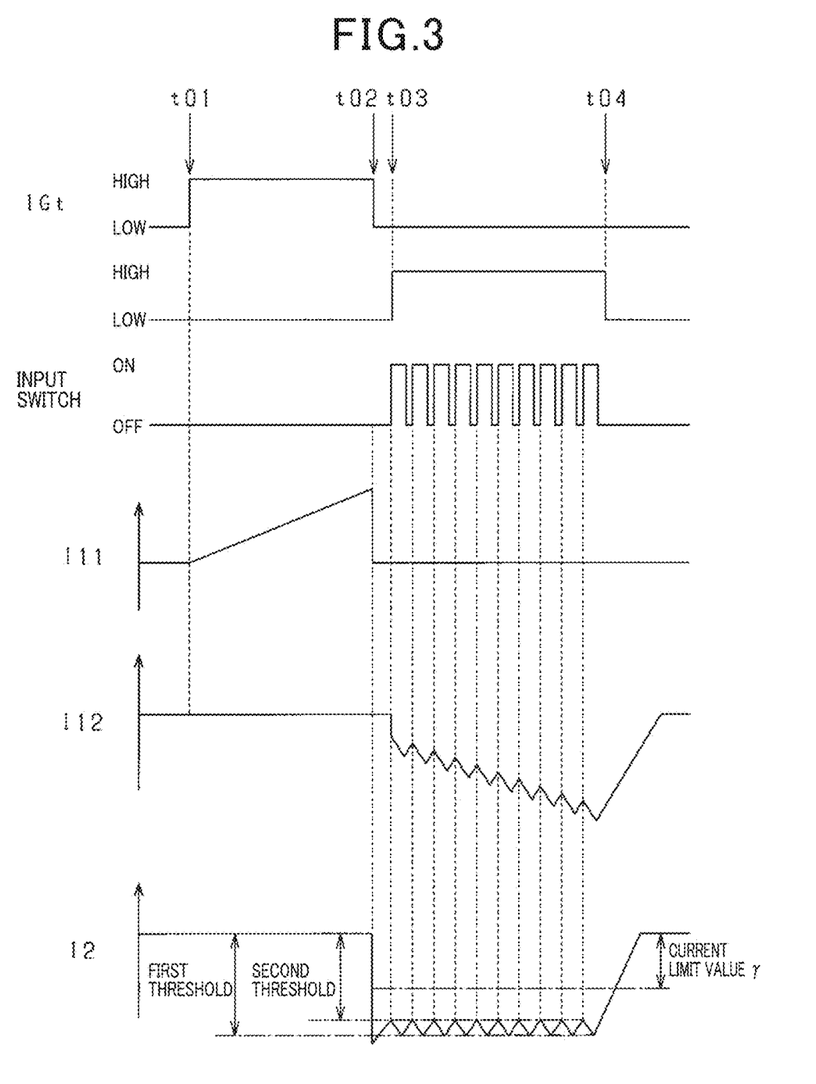
FIG. 3 is a timing chart of a discharge signal, a primary current, and a secondary current (first embodiment)

In FIG. 3, "IGt" indicates the input state of the discharge start signal IGt by high/low. "IGw" indicates the input state of the continued discharge signal IGw by high/low. In addition, "input switch" indicates the ON/OFF of the MOSFET 25. "I11" and "I12" respectively indicate the values of the primary currents flowing to the primary coils 17A and 17B. "I2" indicates the value of the secondary current.

In the ignition apparatus 10 for an internal combustion engine according to the present embodiment, when the discharge start signal IGt changes from low to high (see time t01), the ON state of the power transistor 13 is maintained during the period over which the discharge start signal IGt is held high. As a result, the primary current I11 flows to the primary coil 17A and magnetic energy is accumulated. In addition, electric energy is accumulated in the booster circuit 31.

Eventually, in the ignition apparatus 10 for an internal combustion engine according to the present embodiment, when the discharge start signal IGt changes from high to low, the power transistor 13 is turned OFF and the energization state of the primary coil 17A is interrupted (see time t02). As a result, the magnetic energy accumulated in the primary coil 17A is converted to electric energy. A high voltage is generated in the secondary coil 16A, and electric discharge is started in the spark plug 12. The secondary current I2 that is induced as a result of the primary current I11 being interrupted becomes a negative value in relation to the current flowing from the positive electrode of the battery 11. Therefore, in the graph of the secondary current I2 in FIG. 3, the negative direction is the direction in which the secondary current I2 increases.

In the ignition apparatus 10 for an internal combustion engine according to the present embodiment, after electric discharge is started in the spark plug 12, the secondary current I2 detected by the current detection circuit 29 attenuates in the manner of a substantially triangular waveform. When the continued discharge signal IGw changes from low to high, the ON/Off operation of the MOSFET 25 is started (see time t03). When the secondary current I2 becomes less than a predetermined second threshold prescribed in advance, the continued discharge signal IGw changes from low to high. At this time, the second threshold is provided as a value greater than a current limit value γ that is prescribed as a current value required to maintain the electric discharge.

In the ignition apparatus 10 for an internal combustion engine according to the present embodiment, when the continued discharge signal IGw changes from low to high, the ON operation and the OFF operation of the MOSFET 25 are alternately performed by the second control circuit 26 during the period over which the continued discharge signal IGw is held high. Therefore, the electric energy accumulated in the booster circuit 31 is successively inputted to the primary coil 17B. The primary current I12 flows from the primary coil 17B towards the positive electrode of the battery 11. More specifically, each time the MOSFET 25 is turned ON, the primary current I12 is added to the primary coil 17B to compensate for the decrease in the secondary current I2. As a result, an increase in the primary current I12 further towards the negative side than when the voltage has been previously applied by the MOSFET 25 is repeated (see time t03 to t04). Then, the secondary current I2 increases during the period over which the primary current I12 increases. In FIG. 3, the magnitude of the secondary current I2 at the start of electric discharge is greater than the current limit value γ. However, the magnitude of the secondary current I2 may be less than the critical current value as long as electric discharge can be started.

Then, in the ignition apparatus 10 for an internal combustion engine according to the present embodiment, as a result of the primary current I12 indicating an overall tendency for increase, the secondary current I2 is maintained within a predetermined range. When the secondary current I2 becomes greater than a first threshold, the OFF operation of the MOSFET 25 is performed by the second control circuit 26. As a result, the increase in the primary current I12 is stopped. At this time, the first threshold is set as a value greater than the second threshold.

In this way, in the ignition apparatus 10 for an internal combustion engine according to the present embodiment, the ON/OFF operation of the MOSFET 25 is controlled by the second control circuit 26. Electric discharge is continued by this control being repeatedly performed.

As a result of the above-described configuration, the ignition apparatus 10 for an internal combustion engine according to the present embodiment achieves the following effects.

In the ignition apparatus 10 for an internal combustion engine according to the present embodiment, the MOSFET 25 is provided. The ON/OFF operation of the MOSFET 25 is controlled by the second control circuit 26 so that, after the spark plug 12 starts electric discharge, the electric discharge can be continuously maintained. As a result, although a high voltage of 30 kV or higher is required to start electric discharge, once electric discharge is started, a continued discharge voltage that is generated across the electrodes of the spark plug 12 decreases to 10 kV or less. Therefore, as a result of this configuration, the voltage required to maintain electric discharge after the spark plug 12 starts electric discharge can be reduced, thereby reducing a design withstand voltage of the second ignition coil 15B.

In the ignition apparatus 10 for an internal combustion engine according to the present embodiment, the ECU 20 controls the power transistor 13 and conduction of the primary current I11 flowing to the primary coil 17A of the first ignition coil 15A is performed. As a result of the primary current I11 being interrupted after the conduction has been continued, the spark plug 12 starts electric discharge. Subsequently, the voltage boosted by the booster circuit 31 is applied by the MOSFET 25. As a result, a discharge current in the same direction as the discharge current generated by the power transistor 13 being controlled can be sent between the electrodes of the spark plug 12. Furthermore, as a result of the current path connected to the earth via the diode 28 being provided between the MOSFET 25 and the second ignition coil 15B, the voltage applied to the second ignition coil 15B from the booster circuit 31 can be interrupted by the MOSFET 25. As a result, the primary current I12 is supplied from the earth to the second ignition coil 15B. As a result of this configuration, excessive decrease in the primary current I12, and therefore, decrease in the secondary current I2 can be suppressed.

In the ignition apparatus 10 for an internal combustion engine according to the present embodiment, each time a voltage is applied by the MOSFET 25, ON time is increased or OFF time is decreased from when the MOSFET 25 had previously applied the voltage. As a result, the primary current I12 that flows to the primary coil 17B of the second ignition coil 15B is increased. Therefore, a voltage of a magnitude corresponding to the primary current I12 can be generated in the secondary coil 16B, thereby reducing the decrease in the secondary current I2.

In the ignition apparatus 10 for an internal combustion engine according to the present embodiment, the ECU 20 controls the MOSFET 25 via the second control circuit 26 after the spark plug 12 starts electric discharge. As a result, application and interruption of the voltage boosted by the booster circuit 31 are repeated, and the electric discharge by the spark plug 12 is maintained. As a result of this configuration, the voltage required to maintain electric discharge after the spark plug 12 starts electric discharge can be reduced, thereby reducing a design withstand voltage of the second ignition coil 15B can be reduced.

Specifically, although the withstand voltage of the first ignition coil 15A is 30 kV or higher to start electric discharge, the withstand voltage of the second ignition coil 15B that operates after the start of electric discharge is merely required to be about 10 kV. Therefore, the withstand voltage of the second ignition coil 15B is set to be ⅓ of the withstand voltage of the first ignition coil 15A. Consequently, the insulation distance between the primary coil 17B and the secondary coil 16B, and the grounding body and the secondary coil 16B included in the second ignition coil 15B can be shortened, and the physical size of the second ignition coil 15B can be reduced.

In the ignition apparatus 10 for an internal combustion engine according to the present embodiment, the first ignition coil 15A is inserted into the plug hole 44 formed in the internal combustion engine 47 and the second ignition coil 15B is arranged in the upper portion of the first ignition coil 15A. As a result of this configuration, the two ignition coils 15A and 15B can be compactly housed.

In the ignition apparatus 10 for an internal combustion engine according to the present embodiment, the output side of the secondary coil 16B included in the second ignition coil 15B is connected to the center core 18 provided in the first ignition coil 15A. The lower end portion of the center core 18 is connected to the spark plug 12 via the diode 14B. As a result of this configuration, wiring is not required to be extended to the spark plug 12. Simplification of the structure can be achieved.

In the ignition apparatus 10 for an internal combustion engine 10 according to the present embodiment, when the secondary current I2 detected by the current detection circuit 29 is greater than the first threshold, the ECU 20 interrupts the primary current I12 by the MOSFET 25. Meanwhile, when the secondary current I2 detected by the current detection circuit 29 is less than the second threshold, the ECU 20 conducts the primary current I12 by the MOSFET 25. As a result of this configuration, the secondary current I2 flowing to the secondary coil 16B of the second ignition coil 15B can be kept between the first threshold and the second threshold. Furthermore, even should an unexpected change occur in the secondary current I2, the secondary current I2 can be kept within a desired range by the MOSFET 25 being controlled.

Second Embodiment

A second embodiment will be described below with reference to the drawings, mainly focusing on the differences between the second embodiment and the foregoing first embodiment.

Figure 4:
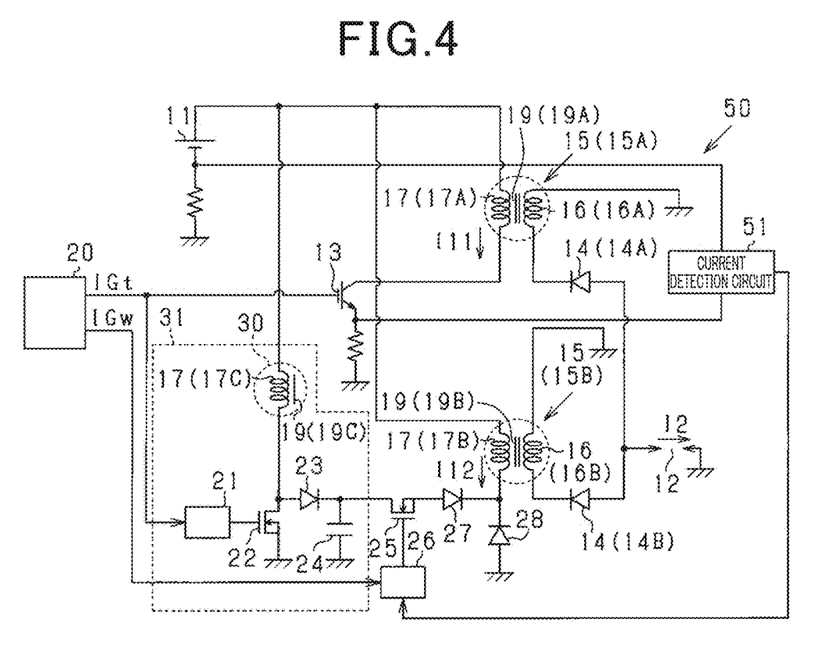
FIG. 4 is a circuit diagram of an electrical configuration of an ignition apparatus for an internal combustion engine (second embodiment)

According to the first embodiment, the current detection circuit 29 is connected with a resistor being provided between the first end of the secondary coil 16B and the earth. According to the present embodiment, as shown in FIG. 4, the current detection circuit 51 (corresponding to a primary current detecting means) is connected with a resistor being provided between the earth and the power transistor 13. In addition, the current detection circuit 51 is connected with a resistor being provided between the earth and the battery 11.

Figure 5:
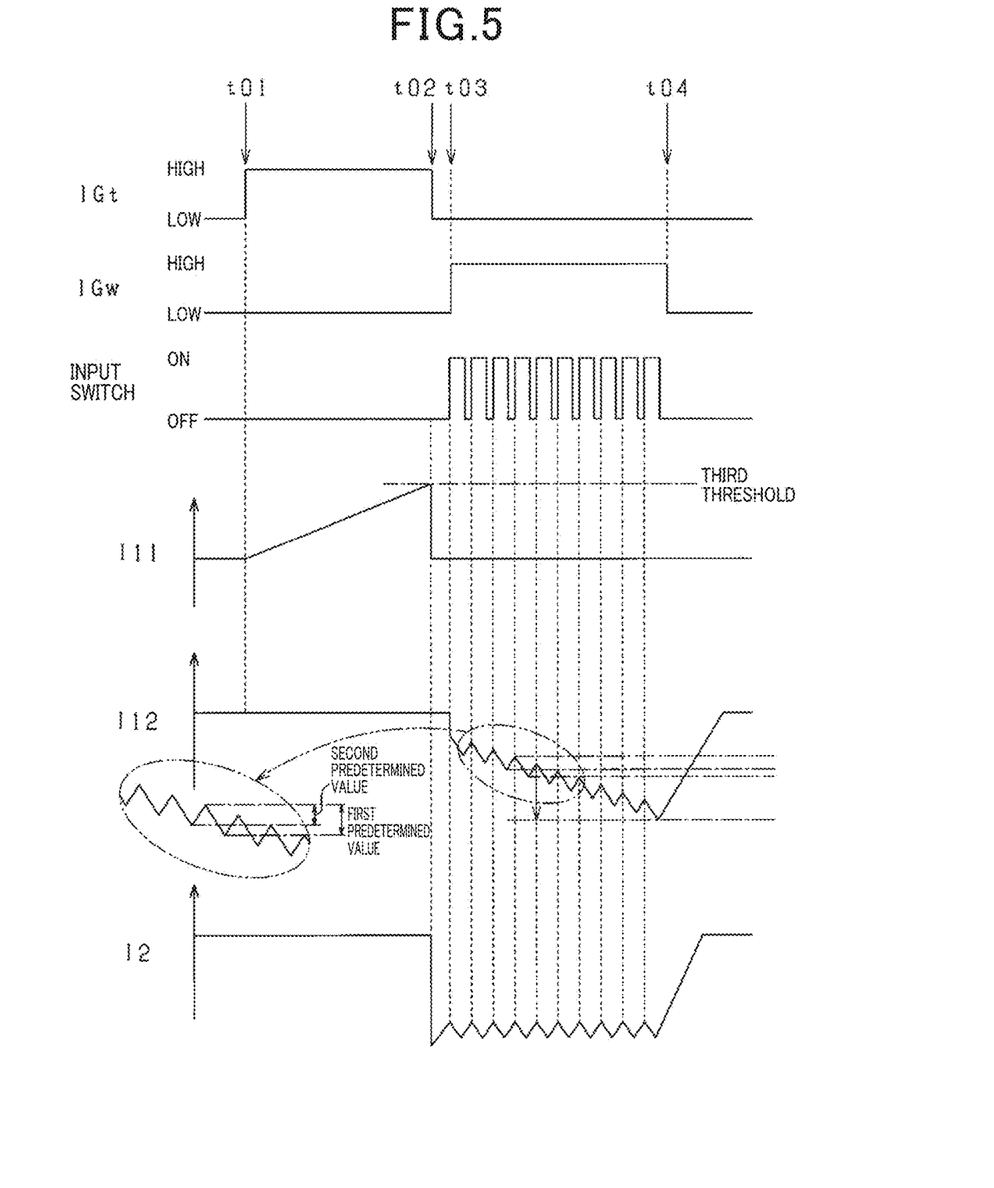
FIG. 5 is a timing chart of a discharge signal, a primary current, and a secondary current (second embodiment)

With reference to FIG. 5, operation of an ignition apparatus 50 for an internal combustion engine according to the present embodiment will be described.

In the ignition apparatus 50 for an internal combustion engine according to the present embodiment, the discharge start signal IGt changes from low to high (see time t01), and the ON state of the power transistor 13 is maintained during the period over which the discharge start signal IGt is held high. As a result, the primary current I11 flows to the primary coil 17A and magnetic energy is accumulated. In addition, electric energy is accumulated in the booster circuit 31.

In the ignition apparatus 50 for an internal combustion engine according to the present embodiment, when a first predetermined time elapses from the start of flow of the primary current I11 to the primary coil 17A, the discharge start signal IGt changes from high to low. As a result, the power transistor 13 is turned OFF and the energization state of the primary coil 17A is interrupted (see time t02). Consequently, the magnetic energy accumulated in the primary coil 17A is converted to electric energy. A high voltage is generated in the secondary coil 16A, and electric discharge is started in the spark plug 12. At this time, the first predetermined time is set to an amount of time over which the primary current I11 increases to a value that is large enough to start the electric discharge in the spark plug 12 and carries no risk of damaging the power transistor 13.

In the ignition apparatus 50 for an internal combustion engine according to the present embodiment, after the elapse of a second predetermined time from the start of electric discharge by the spark plug 12, the continued discharge signal IGw transmitted from the ECU 20 changes from low to high (see time t03). As a result, the MOSFET 25 performs the ON operation by the second control circuit 26 that receives the continued discharge signal IGw, and the primary current I12 flows to the primary coil 17B. At this time, the second control circuit 26 monitors the magnitude of the primary current I12 detected by the current detection circuit 51. In the ignition apparatus 50 for an internal combustion engine, when the magnitude of the primary current I12 increases by a first predetermined amount from when the MOSFET 25 is turned ON (when application of voltage is started), the MOSFET 25 is turned OFF by the second control circuit 26 and the voltage is interrupted. When the primary current I12 decreases by a second predetermined amount from when the MOSFET 25 is turned OFF, the MOSFET 25 is again turned ON and voltage is again applied. As a result of the above-described control being repeatedly performed by the second control circuit 26, electric discharge of the spark plug 12 is continued (see time t03 to t04). At this time, the first predetermined amount and the second predetermined amount are values for suppressing excessive increase and decrease in the secondary current I2. Specifically, the first predetermined amount is set to be greater than the second predetermined amount.

As a result of the above-described configuration, the ignition apparatus 50 for an internal combustion engine according to the present embodiment achieves the following effects.

In the ignition apparatus 50 for an internal combustion engine according to the present embodiment, the current detection circuit 51 is connected with a resistor being provided between the earth and the power transistor 13. In addition, the current detection circuit 51 is connected with a resistor being provided between the earth and the battery 11. As a result of this configuration, the primary current I11 and the primary current I12 can be monitored. Both primary currents I11 and I12 can be precisely controlled.

In the ignition apparatus 50 for an internal combustion engine according to the present embodiment, the current detection circuit 51 that detects the primary current I12 flowing to the primary coil 17B provided in the second ignition coil 15B is provided. The second control circuit 26 can monitor the magnitude of the primary current I12 detected by the current detection circuit 51 at all times. When the primary current I12 detected by the current detection circuit 51 increases by the first predetermined amount from the start of application of the voltage to the primary coil 17B, the second control circuit 26 interrupts the primary current I12 by the MOSFET 25. In addition, when the primary current I12 decreases by the second predetermined amount from the start of interruption of the voltage to the primary coil 17B, the second control circuit 26 again conducts the primary current I12 by the MOSFET 25. The injection apparatus 50 for an internal combustion engine can suppress excessive increase and decrease in the secondary current I2 flowing to the secondary coil 16B of the second ignition coil 15B by repeatedly performing the foregoing control.

The present embodiment can be carried out with the following modifications.

As shown in FIG. 4, according to the present embodiment, the current detection circuit 51 is connected with the resistor being provided between the earth and the battery 11. The current detection method for the primary current I12 may be any other method. For example, the current detection circuit 51 may be connected with a resistor being provided between the diode 28 and the earth. Alternatively, the current detection circuit 51 may be connected with a resistor being provided between the capacitor 24 and the earth.

In addition, the above-described embodiments may be carried out with the following modifications.

Figure 6:
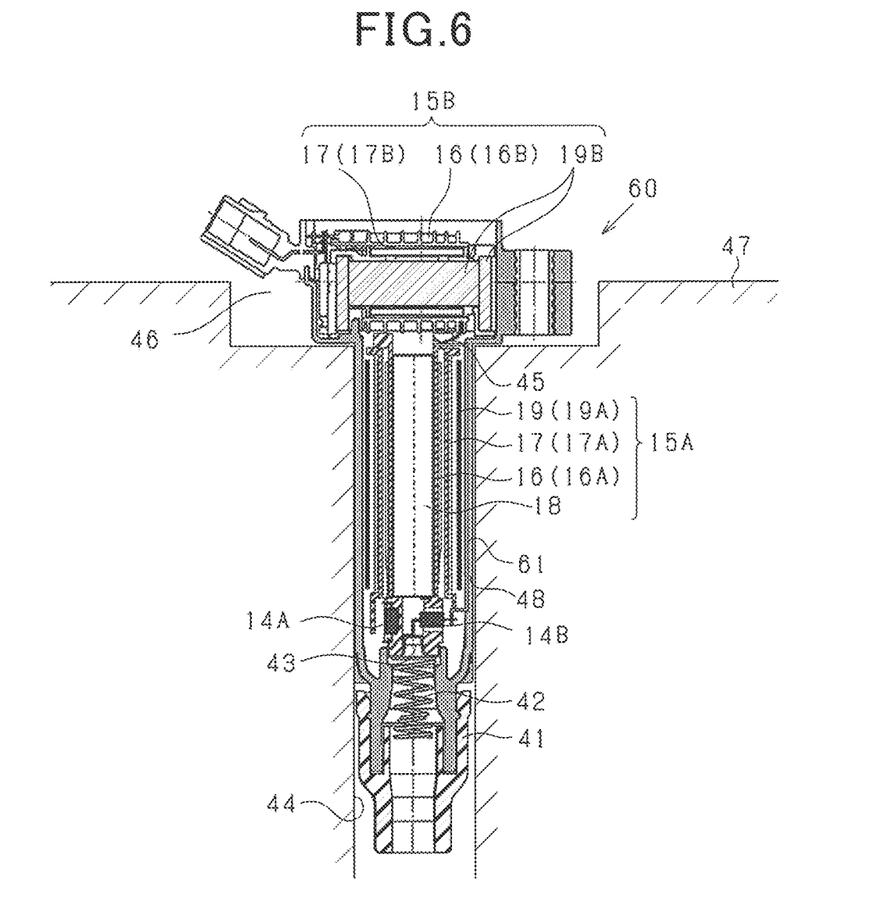
FIG. 6 is a cross-sectional view of the ignition apparatus for an internal combustion engine (variation example).

According to the above-described embodiments, the wire 45 that extends from the secondary side of the second ignition coil 15B is connected to the center core 18 of the first ignition coil 15A. The lower end portion of the center core 18 is connected to an electrode of the spark plug 12 via the diode 14A for pre-ignition prevention. This configuration may be modified as shown in FIG. 6, in which the wire 45 that extends from the secondary side of the second ignition coil 15B is connected to a wire 61 that is provided between a case 48 and the outer core 19A. The wire 61 is connected to the spark plug 12 via the diode 14B.

According to the first embodiment described above, two thresholds are provided for the secondary current I2 and control is performed to keep the secondary current I2 within this range so that the secondary current I2 is maintained in a state greater than the current limit value γ over a certain period. According to the second embodiment described above, the primary current I12 is monitored, and feedback control to suppress excessive increase and decrease in the secondary current I2 is performed in which the ON/OFF operation of the MOSFET 25 is performed when the primary current I12 increases or decreases by a predetermined value prescribed in advance. Regarding this control, the ON/OFF operations of the power transistor 13 and the MOSFET 25 may be controlled based on an amount of time (predetermined cycle) set in advance. As a result of control being performed in this way, according to the above-described embodiments, the current detection circuits 29 and 51 are no longer required, and simplification of the ignition apparatus can be achieved. In addition, at this time, when electric discharge by the spark plug 12 is maintained, the amount of time over which the MOSFET 25 is turned ON is set to be longer than the amount of time the MOSFET 25 is turned OFF. Consequently, according to the above-described embodiments, the primary current I12 can be increased during the period over which the MOSFET 25 is turned ON, by the amount of decrease in the primary current I12 occurring when the MOSFET 25 is turned OFF. As a result, decrease in the secondary current I2 can be suppressed.

According to the above-described embodiments, the first ignition coil 15A is prescribed to be a stick coil and the second ignition coil 15B is prescribed to be a rectangular coil. However, the shapes are not limited thereto. The first ignition coil 15A may be a rectangular coil, and the second ignition coil 15B may be a stick coil. In addition, two rectangular coils may be respectively applied to the first ignition coil 15A and the second ignition coil 15B, or two stick coils may be respectively applied to the first ignition coil 15A and the second ignition coil 15B. In these cases as well, the withstand voltage of the ignition coil to which the voltage for maintaining electric discharge after the spark plug 12 starts electric discharge is applied can be designed so as to be low.

According to the above-described embodiments, the withstand voltage of the second ignition coil 15B is set to be ⅓ of the withstand voltage of the first ignition coil 15A. However, this is not limited thereto. As long as the electric discharge by the spark plug 12 can be maintained, the withstand voltage of the second ignition coil 15B may be equal to, or lower than or higher than, ⅓ of that of the first ignition coil 15A.

REFERENCE SIGNS LIST 11 battery
13 power transistor
15A stick coil
15B rectangular coil
20 ECU
25 MOSFET
31 booster circuit
47 internal combustion engine

The invention claimed is:

1. An ignition apparatus for an internal combustion engine comprising:
    a spark plug that performs electric discharge for igniting a combustible air-fuel mixture inside a combustion chamber of an internal combustion engine;
    a first ignition coil and a second ignition coil that include a primary coil and a secondary coil and apply a voltage to the spark plug by the secondary coil;
    a voltage applying means for applying a predetermined voltage to the primary coil included in the first ignition coil;
    a voltage boosting means for boosting the voltage supplied by the voltage applying means;
    a first switching element that conducts and interrupts a primary current flowing to the primary coil included in the first ignition coil;
    a second switching element that applies the voltage boosted by the voltage boosting means to the primary coil included in the second ignition coil;
    a discharge starting means for starting the electric discharge by the spark plug by controlling the first switching element; and
    a discharge maintaining means for applying the voltage boosted by the voltage boosting means by the second switching element so that electric discharge is maintained after the discharge starting means starts the electric discharge by the spark plug.

2. The ignition apparatus for an internal combustion engine according to claim 1, comprising:
    a current path that is connected to earth via a diode between the second switching element and the second ignition coil, wherein
    the discharge starting means controls the first switching element so that the primary current that flows to the primary coil of the first ignition coil is conducted, and after conduction is continued, the primary current is interrupted and the electric discharge by the spark plug is started, and subsequently, the discharge maintaining means controls the second switching element so that the voltage boosted by the voltage boosting means is applied, thereby sending a discharge current in a same direction as a discharge current generated by control of the first switching element between electrodes of the spark plug, and further, by interrupting the voltage boosted by the voltage boosting means, supplying a current to the primary coil of the second ignition coil from the earth through the current path.

3. The ignition apparatus for an internal combustion engine according to claim 1, wherein
    the primary current flowing to the primary coil of the second ignition coil is increased from when the voltage boosted by the voltage boosting means is previously applied by the second switching element, each time the voltage boosted by the voltage boosting means is applied by the second switching element.

4. The ignition apparatus according to claim 1, wherein a withstand voltage of the second ignition coil is set to be one-third of a withstand voltage of the first ignition coil or lower.

5. The ignition apparatus for an internal combustion engine according to claim 1, wherein the first ignition coil is a cylindrical ignition coil and the second ignition coil is a rectangular ignition coil, and the cylindrical ignition coil is inserted into a plug hole formed in the internal combustion engine, and the rectangular ignition coil is arranged in an upper portion of the cylindrical ignition coil.

6. The ignition apparatus for an internal combustion engine according to claim 1, wherein an output side of a secondary coil of the second ignition coil is connected to a center core of the first ignition coil, and a lower end portion of the center core is connected to the spark plug via a diode.

7. The ignition apparatus for an internal combustion engine according to claim 1, comprising:

a secondary current detecting means for detecting a magnitude of a secondary current flowing to a secondary coil of the second ignition coil, wherein the discharge maintaining means interrupts the voltage boosted by the voltage boosting means by the second switching element when the magnitude of the secondary current detected by the secondary current detecting means is greater than a first threshold, and applies the voltage boosted by the voltage boosting means by the second switching element when the magnitude of the secondary current detected by the secondary current detecting means is less than a second threshold that is smaller than the first threshold.

8. The ignition apparatus for an internal combustion engine according to claim 1, comprising:

a primary current detecting means for detecting a magnitude of a primary current flowing to the primary coil of the second ignition coil, wherein the discharge maintaining means monitors the magnitude of the primary current detected by the primary current detecting means, interrupts the voltage boosted by the voltage boosting means by the second switching element when the primary current increases by a first predetermined amount from start of application of the voltage boosted by the voltage boosting means by the second switching element, and applies the voltage boosted by the voltage boosting means by the second switching element when the primary current decreases by a second predetermined amount from start of interruption of the voltage boosted by the voltage boosting means by the second switching element.

* * * * *